Figure 1:
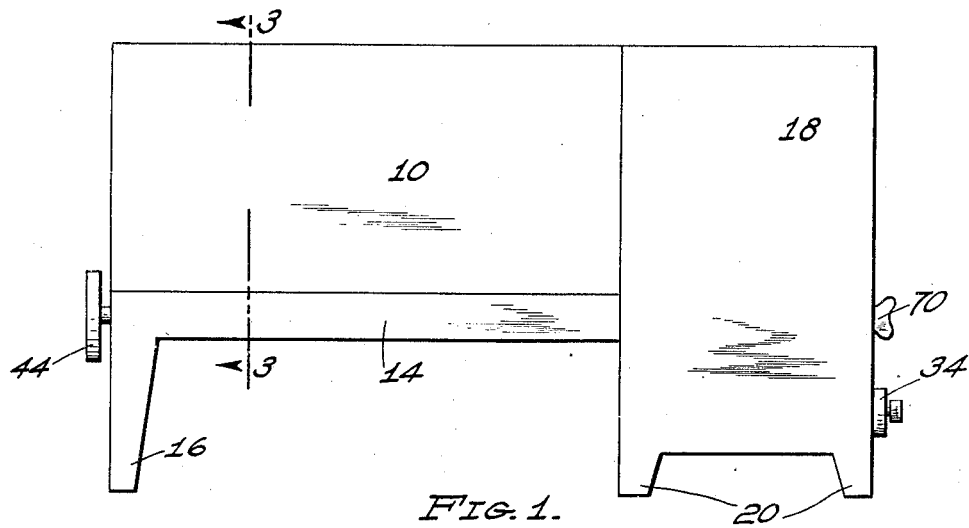

May 1, 1928.  
G. P. RICHARDSON  
AUTOMATIC ELECTRIC TOASTER  
Filed March 5, 1927  
1,667,988  
2 Sheets-Sheet 1

INVENTOR.  
G. P. RICHARDSON  
BY  
ATTORNEY.

May 1, 1928.

G. P. RICHARDSON

AUTOMATIC ELECTRIC TOASTER

Filed March 5, 1927

1,667,988

2 Sheets-Sheet 2

INVENTOR.
G. P. RICHARDSON
BY Fred H Hayn
ATTORNEY.

Patented May 1, 1928.

1,667,988

UNITED STATES PATENT OFFICE.

GEORGE P. RICHARDSON, OF LOS ANGELES, CALIFORNIA.

AUTOMATIC ELECTRIC TOASTER.

Application filed March 5, 1927. Serial No. 173,102.

My invention relates to automatic toasters, and more particularly to toasters of the electric type, whereby it is possible to make light, medium, or very brown toast at the will of the operator.

Primarily my invention contemplates the provision of a novel form of toaster for use in hotels, restaurants, cafeterias and the like, but may, in simplified form, also be used for household purposes.

It accordingly is an object of my invention to provide a novel form of automatic toaster in which an enclosed cover or casing is equipped with a bread conveyor, preferably of the chain type, operated by a motor, preferably in circuit with sets of electric heating elements between which the bread is adapted to be conveyed by said conveyor, said heating elements having associated therewith heat accentuating means, which means may take the form of a set of reflectors adapted to be adjusted so that light, medium or very brown toast may be made.

It is preferred also to provide the oven or casing with duplex bread feed devices for feeding the bread to the conveyer, and also to provide means, in the shape of a clutch or a set of such clutches, for optionally placing one or more of the bread feeding devices into or out of commission.

It is also within the province of my invention to provide a novel form of chain conveyor adapted for special use in connection with my apparatus.

The above and other objects of my invention as will hereinafter more fully appear, I attain with the mechanism and apparatus described and claimed in the specification and illustrated in the drawings accompanying and forming a part of my application.

Reference is had to the accompanying drawings, in which similar reference characters denote similar parts. In the drawings, Fig. 1 is a side elevational view of my invention, Fig. 2 is a part sectional and part elevational view, showing the duplex bread feeding mechanism and the means by which said feed, as well as the conveyor is operated, parts being broken away to disclose the structure.

Figure 2:
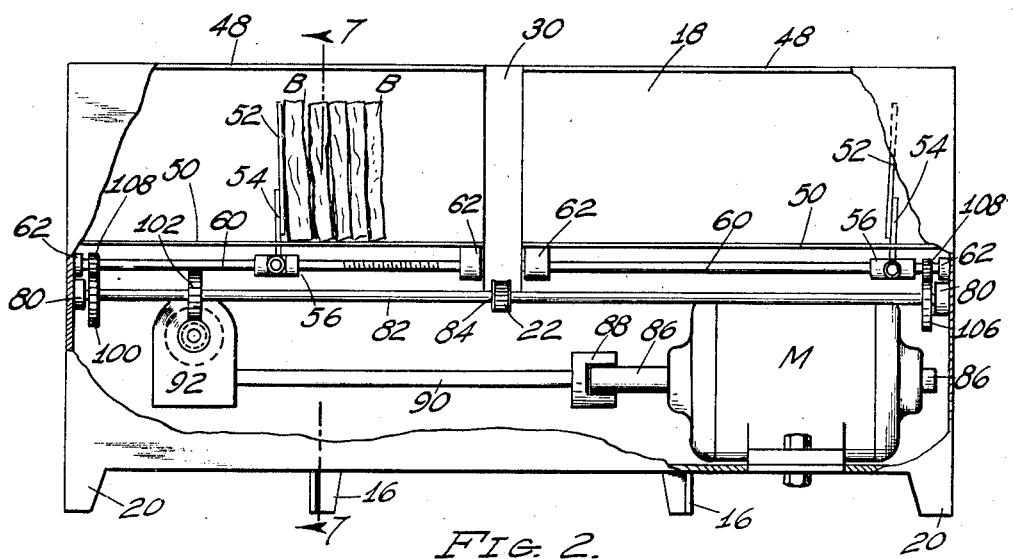
Figure 4:
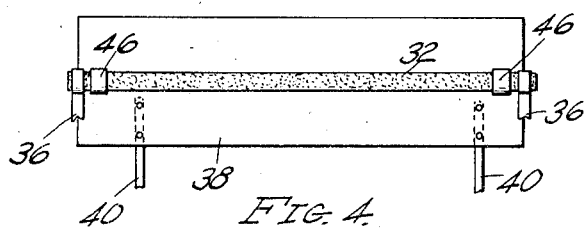
Figure 3:
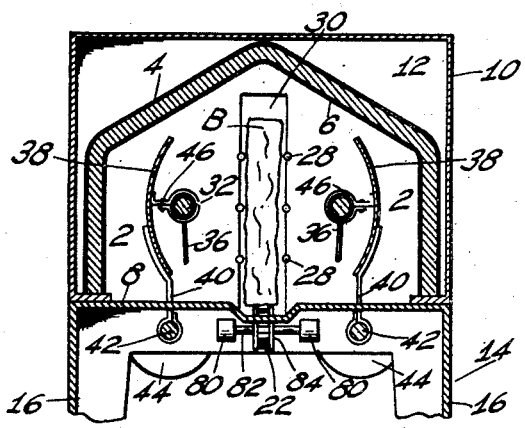
Figure 5:
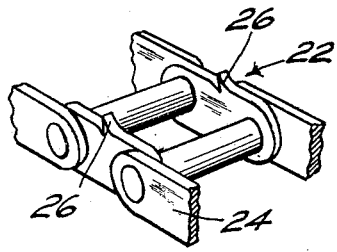
Figure 6:
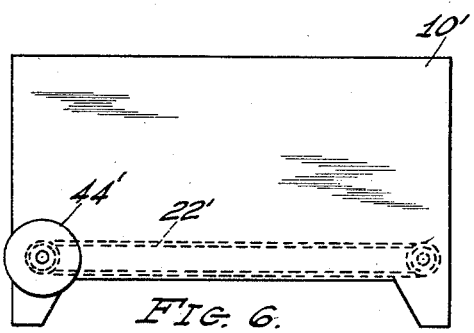
Figure 8:
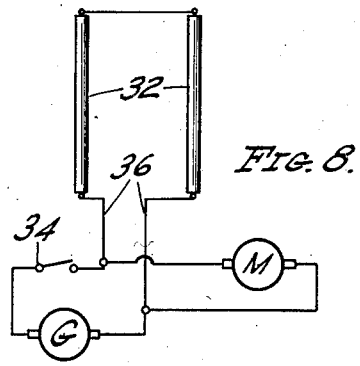
Figure 9:
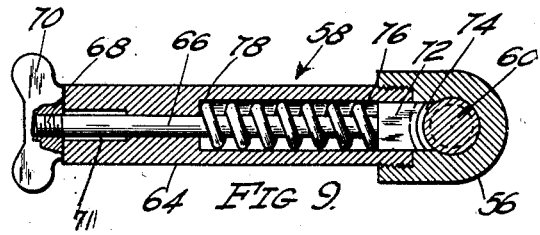
Figure 7:
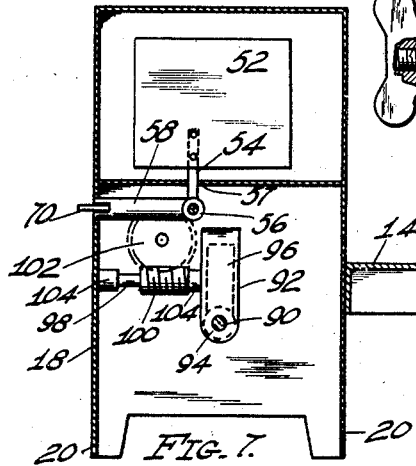

Fig. 3 is a transverse cross-sectional view taken on the line 3—3, Fig. 1, looking in the direction of the arrows, Fig. 4 is a fragmentary elevational view of one of the heating elements and its adjustable reflector, Fig. 5 is a fragmentary detail perspective view, on an enlarged scale, showing my novel form of chain conveyor, Fig. 6 is a side elevational view of a modified form of my invention adapted for household use, Fig. 7 is a transverse cross-sectional view, taken on the line 7—7, Fig. 2, looking in the direction of the arrows, Fig. 8 is a diagrammatic view of the electrical connections between the heating elements, the motor, switch and source of electrical energy, and Fig. 9 is an enlarged sectional detail view of the clutch adapted for use in connection with the bread feed.

Describing my invention more in detail, I provide one or more ovens or casings 2, enclosed by a cover 4, preferably lined with a heat resisting material 6, such as asbestos and the like, which ovens or casings are associated in any preferred manner with a bottom or base 8 of the outer casing or housing 10, an air space being provided above said ovens or casings to prevent heat radiation or to reduce the same to a minimum, said casing being mounted upon a frame or base 14, equipped with legs 16. This construction, however, may be any that in practice may be desired, the exact association of the parts being immaterial.

As seen more particularly in Fig. 1, the outer casing or housing 10 has associated therewith in any manner preferred the bread feeding housing or casing 18, equipped with legs 20, which housing or casing is connected with the frame 14 in any desired manner (see Fig. 7), and houses the bread feeding mechanism, presently to be described, as well as the motor M mounted in any preferred way therein, as seen more particularly in Fig. 2.

The bread slices B are adapted to be fed through the apparatus by means of an especially constructed conveyor 22, preferably of the chain type, made up of links 24, certain of which are equipped with projections 26 for holding the slices of bread in upright position so that they may be evenly toasted, said conveyor being preferably positioned in the bottom or base 8 (see Fig. 3); the bread slices being guided in upright position by the wires or other guide means 28, an opening 30, in the end of the outer casing 10 being provided for the exit of the toasted bread, said guides being mounted in said casing in any manner in practice found desirable.

Preferably, any preferred number of electric heating elements 32, constructed of suitable electric resistance material, may be provided in the ovens, and on each side of the conveyor 22, as seen in Fig. 3.

As will be observed from Fig. 8, the source of electrical energy G, which may be the ordinary house electric light socket, is in circuit with the heating elements 32, a switch 34, and the electric motor M, which of course, may be of any type, leads 36 supplying the current to the elements 32, which elements may be mounted in the ovens in any suitable manner.

Associated with the heating elements 32, are heat accentuating or deflecting means 38, in the shape of reflectors constructed of any preferred material, for deflecting the heat toward the bread. These reflectors are made adjustable so that they can be adjusted toward and away from the bread so that light, medium or very brown toast may be had, at the will of the operator.

Any preferred means of adjusting the reflectors 38 may be provided, the lower portions of which are equipped with operating means 40, connected thereto as desired, and to the operating shafts 42 associated with the frame 14 as preferred and rigidly connected to the hand wheels 44, the manipulation of which will produce the result desired. Fig. 4 shows more particularly the manner in which the heating elements 32 are associated with the deflectors 38, being mounted thereon by the insulated means 46, which may take any form desired.

The bread feeding means is more particularly shown in Fig. 2, the housing 18 having an opening 48 for the insertion of the slices of bread, which bread is positioned on the bottom 50, said bread leaning against the upright plates 52, mounted on the operating means 54, operable in slots 57 (see Fig 7) toward and away from the passageway between the wire guides 28 (see Fig. 3). The operating means 54 is secured on a sleeve 56 of a clutch 58, see more particularly Fig. 9, which sleeve is slidable on the threaded rod or shaft 60, mounted in suitable bearings 62 (see Fig. 2), said rods or shaft, there being preferably two, being only screw-threaded part way, so that the automatic feed may be stopped at any time by means of the clutches 58.

The clutches 58 have a slotted casing 64 associated with the sleeves 56, which casing has a rod 66, screw-threaded on its outer end as at 68, and equipped with an operating means 70, shown in the present instance as a wing nut, and at its other end a portion 72, equipped with threads 74 for engagement with the threaded rods 60. (See Figs. 2 and 9.) A resilient means, in the shape of a coil spring 76, surrounds the rod 66 and engages a cut-away portion 78 on the casing 64 and abuts against the portion 72 for holding said portion in engagement with the threads of the rod or shaft 60. Pulling out and turning the wing nut 70 so that it will be pulled in the slot 71 by the spring 76, places the threads in engagement, which results in the movement of the plate 52 to-toward the passageway between the guides 28, permitting the slices of bread, when the motor M is operated, to drop by one into said passageway and onto the sprocket chain conveyor 22. Releasing the threads 74 from the threads of the rods or shafts 60 by removing the wing nut 70 from the slot 71 so that said nut will be engaged and held by the outer end of the casing 64 permits the sleeve 56 to be slid on the unthreaded portion of said rods, when new bread slices may be added.

Mounted in suitable bearings 80 in the base 8, or otherwise, is a shaft 82, on which is keyed a sprocket wheel 84, (see Fig. 3), over which the conveyor 22 is positioned, there being a similar construction at the other end of the device, the shaft 82 in this instance, of course, being longer. (See Fig. 2.)

The motor M has its shaft 86 connected by a suitable coupling 88 with the shaft 90, mounted in a suitable bearing 92, said shaft having keyed thereto a gear 94 in mesh with a gear 96 mounted on a stub shaft 98, which shaft has a worm gear 100 in mesh with a gear 102 mounted on the rear shaft 82, which drives the sprocket wheels 84 through the chain conveyor 22. See Figs. 2, 3 and 7. The stub shaft 98 is mounted for rotation in suitable bearings 104. Motion of the rear shaft 82 is transmitted to the shafts 60 by the meshing gears 106 and 108. (See Fig. 2.) It will of course, be understood that other means for operating the feeding mechanism and the conveyor may be provided and still remain within the province of my invention.

In the modified form depicted in Fig. 6, there is a hand-operated device for household use, the casing housing a structure similar to that depicted in Fig. 3, the parts being shown in dotted lines, the only difference being that a hand wheel 44' is used for operating the bread conveyor 22', the construction being otherwise the same.

While I have thus described my invention with great particularity, it will be clear that the same is susceptible of modifications throughout a wide range. I accordingly do not propose to be limited to the exact details of construction shown and described but reserve the right in practice to make any and all modifications thereof that fall within the scope of the appended claims.

I claim as my invention:

1. In an automatic toaster, in combination, a casing, means for minimizing heat radiation from said casing, sets of heating elements positioned in said casing, means associated with said elements for accentuating the effect thereof, bread guiding means in said casing, a bread conveyor extending longitudinally through said casing for conveying the bread between said guiding means so said bread may be toasted, bread feeding means for feeding said bread to said conveyor, means for operating said conveyor, and means for optionally rendering said feeding means operative or inoperative.

2. In an automatic toaster, in combination, a housing, means associated with said housing for confining heat therein, sets of heating elements positioned in parallel relation in said housing, reflectors associated with said heating elements for varying the degree of heat directed to the bread, a chain conveyor positioned between said heating elements for conveying the bread between said heating elements, a motor for operating said conveyor, one or more bread feeding means for feeding the bread to the conveyor, and clutches for rendering said feeding means operative or inoperative.

3. In an automatic toaster, in combination, a casing, a bread conveyor operative through the middle of the bottom of said casing, sets of heating elements in said casing positioned on each side of said conveyor, reflectors associated with said heating elements, means for adjusting said reflectors for regulating the degree of heat directed to the bread, a motor, means associated with said motor for operating said conveyor, means in said casing for confining the heat therein, and means for optionally rendering said motor operative or inoperative.

4. In a bread toaster, in combination, a pair of ovens, a bread conveyor operable between said ovens, heating means positioned in said ovens on each side of said conveyor, adjustable reflectors associated with said heating means for adjusting the degree of heat directed to the bread, and means for operating said conveyor.

5. In an automatic toaster, in combination, a pair of ovens, a conveyor operable between said ovens, heating means in each of said ovens, means for operating said conveyor, a duplex feed, operable by said last means, for feeding to said conveyor, and means associated with said feed for optionally rendering said feed operative or inoperative at will.

6. In a clutch adapted for special use in connection with a bread feeding mechanism comprising a casing, a screw threaded member operable transversely through said casing, and manually operable spring retracted means for engaging the threads of said member.

7. In a mechanism for operating an electric toaster, in combination, a casing, heating means mounted in said casing, a bread conveyor adapted to be moved in said casing, said conveyor being provided with projections for holding said bread in upright position, bread feeding mechanism associated with said casing, a shaft for said motor, sets of shafts and stub shafts associated with said casing, and gearing associated with said shaft, said sets of shafts and stub shafts whereby said motor will function to operate said conveyor and said feeding mechanism.

In testimony whereof I have signed my name to this specification.

GEORGE P. RICHARDSON.